United States Patent
Yamaguchi et al.

(10) Patent No.: US 12,552,946 B2
(45) Date of Patent: Feb. 17, 2026

(54) METHOD FOR PRODUCING ZIRCONIA-COATED TITANIUM OXIDE FINE PARTICLES, ZIRCONIA-COATED TITANIUM OXIDE FINE PARTICLES, AND USE THEREOF

(71) Applicant: JGC Catalysts and Chemicals Ltd., Kawasaki (JP)

(72) Inventors: Jun Yamaguchi, Kitakyushu (JP); Naoyuki Enomoto, Kitakyushu (JP); Ryo Muraguchi, Kitakyushu (JP)

(73) Assignee: JGC Catalysts and Chemicals Ltd., Kawasaki (JP)

( * ) Notice: Subject to any disclaimer, the term of this patent is extended or adjusted under 35 U.S.C. 154(b) by 537 days.

(21) Appl. No.: 17/915,609

(22) PCT Filed: Mar. 17, 2021

(86) PCT No.: PCT/JP2021/010724
§ 371 (c)(1),
(2) Date: Sep. 29, 2022

(87) PCT Pub. No.: WO2021/200135
PCT Pub. Date: Oct. 7, 2021

(65) Prior Publication Data
US 2023/0128712 A1   Apr. 27, 2023

(30) Foreign Application Priority Data

Mar. 31, 2020  (JP) .................................. 2020-064316

(51) Int. Cl.
| | |
|---|---|
| *C09D 7/62* | (2018.01) |
| *C08K 9/02* | (2006.01) |
| *C09C 1/36* | (2006.01) |
| *C09C 3/06* | (2006.01) |
| *C09D 7/40* | (2018.01) |
| *C09D 163/00* | (2006.01) |

(52) U.S. Cl.
CPC .............. *C09D 7/62* (2018.01); *C09C 1/3661* (2013.01); *C09C 3/063* (2013.01); *C09D 7/70* (2018.01); *C09D 163/00* (2013.01); *C01P 2004/64* (2013.01); *C01P 2004/84* (2013.01); *C08K 9/02* (2013.01)

(58) Field of Classification Search
CPC .......... C09D 7/62; C09D 7/70; C09D 163/00; C09D 17/007; C09D 201/00; C09C 1/3661; C09C 3/063; C09C 1/36; C01P 2004/64; C01P 2004/84; C08K 9/02; C08K 2003/2241; C01G 23/0536; C01G 23/04

See application file for complete search history.

(56) References Cited

U.S. PATENT DOCUMENTS

| | | | |
|---|---|---|---|
| 5,403,513 | A | 4/1995 | Sato et al. |
| 5,789,476 | A | 8/1998 | Ryo et al. |
| 6,858,294 | B1 | 2/2005 | Tanaka et al. |
| 8,748,001 | B2 | 6/2014 | Muraguchi et al. |
| 8,974,592 | B2 | 3/2015 | Ishihara et al. |
| 9,834,450 | B2 | 12/2017 | Ishihara et al. |
| 2008/0241544 | A1 | 10/2008 | Tadakuma et al. |
| 2009/0061183 | A1 | 3/2009 | Muraguchi et al. |
| 2010/0297447 | A1 | 11/2010 | Tadakuma |
| 2011/0257298 | A1* | 10/2011 | Ishihara .................. G02B 1/14 524/413 |
| 2012/0065312 | A1* | 3/2012 | Ishihara ................ B82Y 30/00 524/413 |
| 2020/0087162 | A1* | 3/2020 | Yamaguchi .......... C01G 23/053 |

FOREIGN PATENT DOCUMENTS

| | | |
|---|---|---|
| CN | 103980737 A | 8/2014 |
| CN | 108461716 A | 8/2018 |
| EP | 2428491 A1 | 3/2012 |
| JP | S63229139 A | 9/1988 |
| JP | H01301517 A | 12/1989 |
| JP | H02255532 A | 10/1990 |
| JP | H052102 A | 1/1993 |
| JP | H0848940 A | 2/1996 |
| JP | H08239223 A | 9/1996 |
| JP | H11172152 A | 6/1999 |
| JP | 2000204301 A | 7/2000 |
| JP | 2002363442 A | 12/2002 |
| JP | 2004018311 A | 1/2004 |
| JP | 2004315288 A | 11/2004 |
| JP | 2007270098 A | 10/2007 |
| JP | 2008024755 A | 2/2008 |
| JP | 2009056387 A | 3/2009 |
| JP | 2009078946 A | 4/2009 |
| JP | 2009155496 A | 7/2009 |
| JP | 2009191167 A | 8/2009 |
| JP | 2010168266 A | 8/2010 |
| JP | 2010208911 A | 9/2010 |
| JP | 2011026154 A | 2/2011 |
| JP | 2011132484 A | 7/2011 |
| JP | 2011136850 A | 7/2011 |
| JP | 2012056816 A | 3/2012 |
| JP | 2015193757 A | 11/2015 |
| WO | 2010073772 A1 | 7/2010 |
| WO | 2014104312 A1 | 7/2014 |
| WO | 2018181241 A1 | 10/2018 |

* cited by examiner

*Primary Examiner* — Anthony J Zimmer
*Assistant Examiner* — Syed T Iqbal
(74) *Attorney, Agent, or Firm* — The Webb Law Firm

(57) ABSTRACT

Provided is a method for producing a zirconia-coated titanium oxide fine particle dispersion which includes (1) a step of preparing a dispersion (1) of titanium oxide fine particles, (2) a step of adding, to the dispersion (1), 1 to 50 parts by mass of an aqueous peroxozirconic acid solution in terms of the mass of $ZrO_2$ per 100 parts by mass of the titanium oxide fine particles, and then aging reaction fine particles (2a) obtained as a result of a reaction between the titanium oxide fine particles and the peroxozirconic acid to thereby obtain a dispersion (2) of a zirconia-coated titanium oxide fine particle precursor (2b), and (3) a step of adjusting the dispersion (2) to have a solid concentration of 0.01 to 10 mass % and then hydrothermally treating the resulting dispersion (2).

4 Claims, No Drawings

METHOD FOR PRODUCING ZIRCONIA-COATED TITANIUM OXIDE FINE PARTICLES, ZIRCONIA-COATED TITANIUM OXIDE FINE PARTICLES, AND USE THEREOF

CROSS-REFERENCE TO RELATED APPLICATIONS

This application is the United States national phase of International Application No. PCT/JP2021/010724 filed Mar. 17, 2021, and claims priority to Japanese Patent Application No. 2020-064316 filed Mar. 31, 2020, the disclosures of which are hereby incorporated by reference in their entirety.

BACKGROUND OF THE INVENTION

Field of the Invention

The present invention relates to a method for producing a dispersion of titanium oxide fine particles, more particularly, to a method for producing a dispersion of titanium oxide fine particles suitably used as, for example, a material of a coating liquid for forming a coating film on a plastic substrate.

Description of Related Art

Titanium oxide fine particles, which have a high refractive index, are suitably used as a material of a coating liquid for forming a coating film on an optical substrate such as a plastic lens. In particular, rutile crystalline titanium oxide fine particles are less photocatalytically active than the anatase type, and thus can reduce degradation of adhesion between the substrate and the coating film caused by decomposition of organosilicon compounds or resin components constituting the film. Examples of the improvement measures taken include a) a method that involves causing titanium oxide to support a metal, b) a method that involves increasing the crystallinity of titanium oxide, and c) a method that involves providing a coating layer.

Regarding the production of a dispersion of rutile crystalline titanium oxide fine particles, for example, Patent Literature 1: JPA 1990-255532 describes that a dispersion of rutile titanium oxide fine particles is obtained by adding hydrogen peroxide to a gel or sol of hydrous titanium oxide to dissolve the hydrous titanium oxide, and heating the solution in the presence of a tin compound in an amount of $TiO_2/SnO_2 = 1.5$ to 14 (by weight). It is also described that the dispersion stability is enhanced by obtaining the sol in such a manner that the aqueous solution resulting from the mixing of the aqueous titanic acid solution and the tin compound is further heated and hydrolyzed in the presence of a silicon compound.

For a) the method that involves causing titanium oxide to support a metal, Patent Literature 2: JPA 1993-002102 and Patent Literature 3: JPA 1999-172152 aim to provide a coating liquid for forming a hardcoat film having a high refractive index and excellent transparency, weather resistance, and adhesion to a substrate, disclose that the coating liquid for forming a film contains composite oxide fine particles containing a titanium oxide component and an iron oxide component in $Fe_2O_3/TiO_2$ (weight ratio) of 0.0005 or more but less than 0.005. Composite anatase titanium oxide/ iron oxide fine particles obtained by preparing composite oxide particles of titanium oxide and iron oxide by the production method disclosed in Patent Literature 3: JPA 1999-172152 are less photocatalytically active, and thus a film obtained by using a coating liquid containing such composite oxide fine particles exhibits excellent weather resistance.

For b) the method that involves increasing the crystallinity of titanium oxide, Patent Literature 4: JPA 2010-168266, Patent Literature 5: JPA 2011-132484, and Patent Literature 6: JPA 2011-136850 describe particles obtained by calcining core particles and then forming shell layers thereon and particles obtained by calcining core-shell particles, and all clearly disclose improvement in weather resistance over uncalcined particles.

For c) the method that involves providing a coating layer, Patent Literature 7: JPA 1996-048940, Patent Literature 8: JPA 2000-204301, and Patent Literature 9: WO 2018/181241 disclose core-shell fine particles composed of cores formed of, rutile titanium oxide fine particles or iron-containing rutile titanium oxide fine particles, and a composite oxide composed of oxides of silicon, zirconium, antimony, and aluminum and covering the cores. This configuration weakens the photocatalytic activity of the rutile titanium oxide fine particles, and thus a film obtained from a coating liquid containing such core-shell fine particles exhibits excellent weather resistance.

Also available are particles obtained by surface-treating core particles formed of titanium-containing metal oxide fine particles with a hydrate and/or an oxide of at least one metal element such as zirconium or antimony, and Patent Literature 10: JPA 2012-056816 discloses surface-treated particles treated with a hydrate and/or an oxide of zirconium. It is disclosed that using these particles offers outstanding dispersion stability and transparency, and that a film formed from a coating liquid containing these particles exhibits improved weather resistance and light resistance.

Furthermore, Patent Literature 11: JPA 2002-363442 discloses antimony oxide-coated particles.

SUMMARY OF THE INVENTION

Technical Problem

The findings of the present inventors have revealed that existing titanium oxide fine particles have room for improvement from the viewpoint of achieving excellent weather resistance and light resistance while maintaining a high refractive index.

It is therefore an object of the present invention to provide titanium oxide fine particles that are less photocatalytically active (in other words, have excellent weather resistance and light resistance) while maintaining a high refractive index. Other objects of the present invention include to provide a dispersion of such fine particles, and to provide a method for producing such a dispersion.

Solution to Problem

The present inventors have carried out extensive studies and have found that the above problem can be solved by using titanium oxide fine particles as core particles and by densely covering these core particles with zirconia, thereby completing the present invention. A summary of the present invention is as described below.

[1]

A method for producing a zirconia-coated titanium oxide fine particle dispersion, the method including:

(1) a step of preparing a dispersion (1) of titanium oxide fine particles that satisfy a requirement (a) below;

(2) a step of adding, to the dispersion (1), 1 to 50 parts by mass of an aqueous peroxozirconic acid solution in terms of the mass of $ZrO_2$ per 100 parts by mass of the titanium oxide fine particles, and then aging reaction fine particles (2a) obtained as a result of a reaction between the titanium oxide fine particles and the peroxozirconic acid to thereby obtain a dispersion (2) of a zirconia-coated titanium oxide fine particle precursor (2b); and (3) a step of adjusting the dispersion (2) to have a solid concentration of 0.01 to 10 mass % and then hydrothermally treating the resulting dispersion (2) to obtain a dispersion of zirconia-coated titanium oxide fine particles.

Requirement (a): The titanium oxide fine particles contain 60 mass % or more of Ti in terms of the mass of $TiO_2$ and at least one metal element selected from the group consisting of Al, Zr, Sb, Zn, Ni, Fe, Ba, Mg, Sn, Si, and V.

[2]

The method for producing a zirconia-coated titanium oxide fine particle dispersion of [1] above, wherein, in the step (2), D3/D2 is 1.1 to 3.0 and Hz3/Hz2 is 0.8 to 1.2, where D2 and Hz2 respectively represent an average particle size and a haze (%) of the reaction fine particles (2a) upon completion of addition of the aqueous peroxozirconic acid solution, and D3 and Hz3 respectively represent an average particle size and a haze (%) of the precursor (2b).

[3]

A zirconia-coated titanium oxide fine particle dispersion produced by the method of [1] or [2] above.

[4]

Zirconia-coated titanium oxide fine particles isolated from the zirconia-coated titanium oxide fine particle dispersion of [3] above.

[5]

Zirconia-coated titanium oxide fine particles that include titanium oxide fine particles satisfying a requirement (a) below and zirconia coating layers covering the titanium oxide fine particles and satisfying a requirement (b) below, that satisfy a requirement (c) below, and that have an average particle size of 3 to 50 nm.

Requirement (a): The titanium oxide fine particles contain 60 mass % or more of Ti in terms of the mass of $TiO_2$ and at least one metal element selected from the group consisting of Al, Zr, Sb, Zn, Ni, Fe, Ba, Mg, Sn, Si, and V.

Requirement (b): The amount of the zirconia coating layers per 100 parts by mass of the titanium oxide fine particles is, 1 to 50 parts by mass in terms of the mass of $ZrO_2$.

Requirement (c): When the average particle size and the color fading rate of the titanium oxide fine particles are represented by D1 and PA1, respectively, and the average particle size and the color fading rate of the zirconia-coated titanium oxide fine particles are represented by D4 and PA4, respectively, D4/D1 is 0.8 to 1.2 and PA4/PA1 is 0.4 or less.

[6]

The zirconia-coated titanium oxide fine particles of [5] above, wherein the titanium oxide fine particles contain Ti and Sn in such amounts that the $TiO_2/SnO_2$ mass ratio is 3 to 16.

[7]

A dispersion of the zirconia-coated titanium oxide fine particles of [5] or [6] above.

[8]

A paint composition including the zirconia-coated titanium oxide fine particles of any one of [4] to [6] above, and a matrix component.

[9]

A coating film obtained by curing the paint composition of [8] above.

[10]

A coated substrate including a substrate and the coating film of [9] above disposed on a surface of the substrate.

Advantageous Effects of Invention

The production method of the present invention can provide titanium oxide fine particles (zirconia-coated titanium oxide fine particles) that are less photocatalytically active (in other words, have excellent weather resistance and light resistance) than the conventional titanium oxide fine particles while maintaining a high refractive index. The invention also provides, for example, a dispersion of the titanium oxide fine particles, a paint composition that contains the fine particles, and methods for producing the titanium oxide fine particles, the dispersion, and the paint composition.

Furthermore, the zirconia-coated titanium oxide fine particles of the present invention have excellent weather resistance and light resistance (less photocatalytically active) while maintaining a high refractive index.

In addition, a hardcoat layer that has a higher refractive index and is less photocatalytically active, and a coated substrate that includes a UV-blocking coating layer can be provided from the paint composition.

DESCRIPTION OF THE INVENTION

The present invention will be described in detail hereinbelow.

[Zirconia-Coated Titanium Oxide Fine Particles]

Zirconia-coated titanium oxide fine particles of the present invention are zirconia-coated titanium oxide fine particles (hereinafter may also be referred to as "zirconia-coated titanium oxide fine particles (I)") that include titanium oxide fine particles-satisfying a requirement (a) below and zirconia coating layers covering the titanium oxide fine particles and satisfying a requirement (b) below, that satisfy a requirement (c) below, and that have an average particle size of 3 to 50 nm.

Requirement (a): The titanium oxide fine particles contain 60 mass % or more of Ti in terms of the mass of $TiO_2$ and at least one metal element selected from the group consisting of Al, Zr, Sb, Zn, Ni, Fe, Ba, Mg, Sn, Si, and V.

Requirement (b): The amount of the zirconia coating layer per 100 parts by mass of the titanium oxide fine particles is 1 to 50 parts by mass in terms of the mass of $ZrO_2$.

Requirement (c): When the average particle size and the color fading rate of the titanium oxide fine particles are represented by D1 and PA1, respectively, and the average particle size and the color fading rate of the zirconia-coated titanium oxide fine particles are represented by D4 and PA4, respectively, D4/D1 is 0.8 to 1.2 and PA4/PA1 is 0.4 or less.

<<Core Particles>>

The ratio (in terms of $TiO_2$) of Ti in the titanium oxide fine particles is preferably 60 mass % or more and more preferably 65 mass %.

The crystal structure of titanium oxide contained in the titanium oxide fine particles may be anatase or rutile, and is preferably rutile from the viewpoint of photoactivity.

Examples of the preferable forms of the titanium oxide fine particles include following titanium oxide fine particles (i) to (iv) (some of these have overlaps).

Titanium oxide fine particles (i) are titanium oxide-based composite oxide fine particles that include a Sn-containing rutile titanium oxide and have a Ti/Sn ratio in the range of preferably 3 to 16 and more preferably 4 to 13 in terms of the $TiO_2/SnO_2$ mass ratio.

Titanium oxide fine particles (ii) are titanium oxide-based composite oxide particles that contain 25 mass % or less and preferably 0.1 to 10 mass % of Sb in terms of $Sb_2O_5$, 10 mass % or less and preferably 0.1 to 5 mass % of Fe in terms of $Fe_2O_3$, 3 mass % or less and preferably 0.001 to 1 mass % of Ni in terms of NiO, and 15% or less and preferably 0.5 to 10 mass % of Zr in terms of $ZrO_2$.

The titanium oxide fine particles (iii) are crystalline titanium oxide-based composite oxide particles that contain nickel and zirconium, do not have a noticeable color, and can reduce photoactivity. The nickel content in the titanium oxide fine particles (iii) is preferably 0.001 to 1 mass % and more preferably 0.01 to 0.08 mass % in terms of NiO, and the zirconium content is preferably 0.5 to 10 mass % and more preferably 1 to 8 mass % in terms of $Zro_2$.

The titanium oxide fine particles (iv) are crystalline titanium oxide-based composite oxide particles that contain iron and antimony, are relatively low-color, and can powerfully reduce photoactivity. The iron content in the titanium oxide fine particles (iv) is preferably 0.1 to 5 mass % and more preferably 0.2 to 4 mass % in terms of $Fe_2O_3$, and the antimony content is preferably 0.1 to 10 mass % and more preferably 0.4 to 8 mass % in terms of $Sb_2O_5$. The antimony/iron ratio in terms of the $(Sb_2O_5/Fe_2O_3)$ oxide mass ratio is preferably 0.5 to 10, more preferably 1 to 5, and yet more preferably 2 to 2.5.

It is considered that some of titanium sites of titanium oxide constituting the titanium oxide fine particles are replaced by the metal elements other than titanium.

<<Coating Layer>>

The zirconia-coated titanium oxide fine particles of the present invention are core-shell fine particles composed of the titanium fine particles covered with zirconia-containing layers (hereinafter, may also be referred to as "coating layers").

The coating layers can further lower the photoactivity of the titanium oxide fine particles that serve as core particles.

The zirconium content (in terms of $Zro_2$) in the coating layers of the zirconia-coated titanium oxide fine particles per 100 parts by mass of the titanium oxide fine particles serving as the core particles is preferably 1 to 50 parts by mass and preferably 2 to 40 parts by mass. This amount can be controlled by adjusting the amounts in which the titanium oxide fine particles and the raw materials of the coating layers are fed.

The coating layers contain zirconia as a main component. When components other than zirconia are contained in the coating layers, the amount thereof (in terms of oxide) with respect to the amount of the coating layers (100 mass %) is preferably less than 50 mass % and more preferably 10 mass % or less. This amount can be controlled by adjusting the amounts in which the raw materials of the coating layers are fed.

<<Zirconia-Coated Titanium Oxide Fine Particles>>

The average particle size of the zirconia-coated titanium oxide fine particles of the present invention is 3 to 50 nm and preferably 6 to 45 nm. In the present invention, the values of the average particle size of various types of fine particles are determined by diluting the fine particles with a solvent (this solvent is water unless otherwise noted) so that the solid concentration is 0.1 mass %, performing a dynamic light scattering method thereon, and determining the average particle size by cumulant analysis.

When the average particle size and the color fading rate of the titanium oxide fine particles are represented by D1 and PA1, respectively, and the average particle size and the color fading rate of the zirconia-coated titanium oxide fine particles are represented by D4 and PA4, respectively, D4/D1 is 0.8 to 1.2 and preferably 0.9 to 1.1, and PA4/PAI is 0.4 or less. The lower limit of PA4/PA1 may be, for example, 0.001. D4/D1 and PA4/PA1 within the aforementioned ranges indicate that dense zirconia coating layers are formed on the surfaces of the titanium oxide fine particles.

The color fading rate is a rate of change under UV irradiation per unit time in the absorbance of a dye in a system containing the titanium oxide fine particles and the dye, and is measured by the following method.

<Method for Measuring Color Fading Rate>

To an aqueous dispersion of fine particles to be measured in an amount corresponding to 0.05 g in terms of the solid mass, a solvent is appropriately added so that the water/methanol ratio is 1/1 (mass ratio) and the solid concentration is 0.5 mass %. Next, the resulting dispersion is mixed together with a glycerol solution of sunset yellow FCF dye having a solid concentration of 0.02 mass % so that the mass ratio (mass of dispersion/mass of glycerol solution) is 1/3. The sample thus prepared is placed in a quartz cell 1 mm in depth, 1 cm in width, and 5 cm in height. Next, the 1 cm (width)×5 cm (height) face of the quartz cell is irradiated with 0.4 mW/cm$^2$ (in terms of 365 nm wavelength) UV light emitted from a UV lamp placed 5.5 cm away from that face and preset to emit a range of wavelengths including i-line (wavelength: 365 nm).

The 490 nm-absorbance ($A_0$) of the sample before UV irradiation and the 490 nm-absorbance ($A_n$) of the sample after n hours of UV irradiation were measured with an ultraviolet visible light spectrophotometer, and the color fading rate of the dye was calculated from the following equations.

$$\text{Ratio of change in color}=(A_n-A_0)/A_0\times100(\%)$$

$$\text{PA (color fading rate)}=\text{ratio of change in color/UV irradiation time (\%/h)}$$

The UV irradiation time is adjusted as follows according to the color fading rate.
(1) If the color fading rate is 30%/h or more, the UV irradiation time is the time taken until the ratio of change in color reaches 70 to 90%.
(2) If the color fading rate is 3%/h or more and less than 30%/h, the UV irradiation time is 3 hours.
(3) If the color fading rate is less than 3%/h, the UV irradiation time is 20 hours.

The values of the average particle size and the color fading rate are, more specifically, values measured by the methods employed in Examples described below.

The zirconia-coated titanium oxide fine particles of the present invention are less photocatalytically active than the conventional titanium oxide fine particles while maintaining a high refractive index.

In addition, the zirconia-coated titanium oxide fine particles have high shape uniformity. That the fine particles have high shape uniformity can be confirmed by observing the fine particles with a scanning electron microscope (SEM). Thus, the zirconia-coated titanium oxide fine particles are also excellent in transparency.

[Zirconia-Coated Titanium Oxide Fine Particle Dispersion]

A zirconia-coated titanium oxide fine particle dispersion of the present invention is a dispersion of the zirconia-coated titanium oxide fine particles of the present invention, and may be a dispersion in water, in water and an organic solvent, or in an organic solvent. A dispersion including an organic solvent as the dispersion medium may be produced by, for example, substituting part or the whole of water in a dispersion with an organic solvent by a known technique such as a rotary evaporator or an ultrafiltration membrane.

Examples of the organic solvent that can be used in the zirconia-coated titanium oxide fine particle dispersion include the following:

- alcohols such as methanol, ethanol, 1-propanol, 2-propanol, 1-butanol, 2-butanol, and octanol;
- esters such as ethyl acetate, butyl acetate, ethyl lactate, propylene glycol monomethyl ether acetate, propylene glycol monoethyl ether acetate, and γ-butyrolactone;
- ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether;
- ketones such as acetone, methyl ethyl ketone, methyl isobutyl ketone, acetylacetone, and cyclohexanone;
- aromatic hydrocarbons such as benzene, toluene, xylene, and ethylbenzene;
- cyclic hydrocarbons such as cyclohexane; and
- amides such as dimethylformamide, N, N-dimethylacetoacetamide, and N-methylpyrrolidone. These organic solvents may be used singly, or two or more may be used in combination.

[Method for Producing Zirconia-Coated Titanium Oxide Fine Particle Dispersion]

A method of the present invention for producing a zirconia-coated titanium oxide fine particle dispersion includes steps (1) to (3) below.

Step (1)

Step (1) involves preparing a dispersion (1) of titanium oxide fine particles that satisfy the requirement (a).

The titanium oxide fine particles are used as core particles.

For example, in the step (1), a dispersion of titanium oxide fine particles (core particles) can be made (prepared) as follows.

In order to prepare a dispersion of anatase titanium oxide fine particles, the method described in patent literature JPA 1988-229139 is employed.

In order to prepare a dispersion of rutile titanium oxide fine particles, methods described in patent literatures JPA 1990-255532, JPA 1996-048940, JPA 2000-204301, JPA 2002-363442, JPA 2012-056816, and JPA 2015-193757 are employed.

In order to prepare a dispersion of metal-supporting titanium oxide fine particles, methods described in patent literatures JPA 1989-301517, JPA 1996-239223, JPA 1999-172152, and WO 2018/181241 are employed.

In order to prepare a dispersion of fine particles composed of a rutile titanium oxide calcined product, methods described in patent literatures JPA 2010-168266, JPA 2011-132484, JPA 2011-136850, and WO 2010/073772 are employed.

Alternatively, a dispersion of titanium oxide fine particles may be prepared by purchasing a commercially available product.

The titanium oxide fine particles preferably satisfy the requirement (a). The details of the titanium oxide fine particles are as described above.

Step (2)

The step (2) involves adding an aqueous peroxozirconic acid solution to the dispersion (1) and then aging the fine particles (hereinafter may also be referred to as "reaction fine particles (2a)") obtained as a result of a reaction between the titanium oxide fine particles and the peroxozirconic acid to thereby obtain a dispersion (2) of a zirconia-coated titanium oxide fine particle precursor (2b).

The aqueous peroxozirconic acid solution may be prepared by, for example, a method described in patent literature JPA 2012-056816, that is, a method that involves peptizing a zirconia sol with potassium hydroxide and an aqueous hydrogen peroxide solution.

The amount of the aqueous peroxozirconic acid solution to be added to the dispersion (1) is set so that the amount in terms of the mass of $ZrO_2$ is 1 to 50 parts by mass and preferably 2 to 40 parts by mass per 100 parts by mass of the titanium oxide fine particles serving as the core particles.

The temperature at which the aqueous peroxozirconic acid solution is added is preferably 10 to 40° C. and more preferably about room temperature (20 to 25° C.). When the temperature is within this range, the decrease in the contribution of peroxozirconic acid, which undergoes decomposition and gelling under heating, to formation of the coating layer can be prevented.

The time for which the aqueous peroxozirconic acid solution is added is preferably within 2 hours.

The aging involves heating a dispersion containing the reaction fine particles (2a) at preferably 50 to 80° C. for preferably 0.5 to 18 hours.

When the step (2) is carried out under such conditions, D3/D2 can be adjusted to 1.1 to 3.0 and Hz3/Hz2 can be adjusted to 0.8 to 1.2 in the step (2), where D2 and Hz2 respectively represent the average particle size and the haze (%) of the reaction fine particles (2a) upon completion of addition of the aqueous peroxozirconic acid solution, and D3 and Hz3 respectively represent the average particle size and the haze (%) of the precursor (2b) (in other words, the reaction fine particles (2a) after aging) in the step (2). At D3/D2 and Hz3/Hz2 within the aforementioned ranges, decomposition or gelling of peroxozirconic acid can be appropriately reduced, and zirconia coating layers can be uniformly formed on the core particles.

D3/D2 is preferably 1.2 to 2.5, and Hz3/Hz2 is preferably 0.8 to 1.1.

The haze as defined in the present invention is a value measured by preparing a measurement target, such as fine particles or a precursor, into a dispersion (the dispersion medium is water unless otherwise noted) having a solid concentration of 1.5 mass %, placing the dispersion in a quartz cell having an optical path length of 33 mm, and measuring the haze of the dispersion in the quartz cell.

The values of the average particle size and the haze are, more specifically, values measured by the methods employed in Examples described below.

Step (3)

The step (3) involves adjusting the solid concentration of the dispersion (2) to 0.01 to 10 mass % and hydrothermally treating the resulting dispersion (2) to obtain a zirconia-coated titanium oxide fine particle dispersion.

If the dispersion (2) has a high foreign ion concentration, desired fine particles may not be obtained in the step (3); thus, before the hydrothermal treatment, the solid concentration of the dispersion (2) is adjusted to 0.01 to 10 mass % and preferably 0.01 to 5 mass %. Typically, the dispersion (2) is diluted to decrease the solid concentration and the foreign ion concentration. Dilution typically involves addition of water.

The value of the solid concentration is the ratio of the mass of the ignition residue (solid) obtained by calcining a measurement sample, from which the solvent has been preliminarily removed, at 1000° C. for 1 hour to the mass of the measurement sample.

The hydrothermal treatment is carried out preferably in a pressure and heat resistant container and more preferably in a stainless steel autoclave.

The hydrothermal treatment is preferably carried out at 130 to 250° C. and more preferably carried out at 150 to 2000° C. for preferably 10 to 100 hours and more preferably 12 to 40 hours. When the hydrothermal treatment is carried out under the aforementioned conditions, the zirconium compound added in the step (2) can more firmly cover the surfaces of the core particles, and a coated titanium oxide fine particles dispersion can thereby be obtained.

When the step (3) is carried out under the aforementioned conditions, D4/D1 can be adjusted to 0.8 to 1.2 (preferably 0.9 to 1.1) and PA4/PA1 can be adjusted to 0.4 or less, where D1 and PA1 respectively represent the average particle size and the color fading rate of the titanium oxide fine particles, and D4 and PA4 respectively represent the average particle size and the color fading rate of the zirconia-coated titanium oxide fine particles. The lower limit of PA4/PA1 may be, for example 0.001. That D4/D1 and PA4/PA1 are within the aforementioned ranges indicate that the titanium oxide fine particles are in a dispersed state and dense zirconia coating layers are sufficiently formed. Thus, if such fine particles are used in a paint composition, a transparent cured coating film can be obtained, and excellent weather resistance and light resistance are obtained due to lower photocatalytic activity.

Zirconia-coated titanium oxide fine particles may be isolated from the zirconia-coated titanium oxide fine particle dispersion obtained in the step (3). A conventionally known method can be employed as the isolation method.

Examples of the zirconia-coated titanium oxide fine particles of the present invention include, in addition to the zirconia-coated titanium oxide fine particles (I) described above, zirconia-coated titanium oxide fine particles (hereinafter may also be referred to as "zirconia-coated titanium oxide fine particles (II)") that have been isolated from the zirconia-coated titanium oxide fine particle dispersion produced by the method that includes the steps (1) to (3).

(Surface Treatment of Zirconia-Coated Titanium Oxide Fine Particles)

In order to disperse the zirconia-coated titanium oxide fine particles in an organic solvent or a solution containing a dispersed resin without causing aggregation of the zirconia-coated titanium oxide fine particles in the dispersion, the surfaces of the zirconia-coated titanium oxide fine particles may be hydrophobized with a surface treating agent.

This hydrophobization step is a step in which a surface treating agent is added into the dispersion and, as required, the mixture is further heated or hydrothermally treated. This step may be performed before water in the aqueous dispersion described hereinabove is replaced by a solvent (hereinafter, this operation will be also written as the "solvent replacement"), or may be performed concurrently with or after the solvent replacement. A catalyst such as ammonia may be used in this step as required.

Known surface treating agents may be used, with examples including alkoxide compounds such as tetraethoxysilane and triisopropoxyaluminum, coupling agents such as silane coupling agents and titanium coupling agents, low-molecular or high-molecular surfactants such as nonionic, cationic or anionic surfactants, and metal soap salts such as fatty acid metal salts and naphthenic acid metal salts.

The dispersion of the thus-prepared zirconia-coated titanium oxide fine particles in water and/or an organic solvent can be used in a coating film-forming coating liquid or can be blended with a resin composition by appropriate conventionally know methods.

[Paint Composition]

A paint composition according to the present invention includes the zirconia-coated titanium oxide fine particles of the present invention and a matrix component. The paint composition may further include a curing catalyst or an additive.

The paint composition may be a thermally curable paint composition or a photocurable paint composition.

The thermally curable paint composition includes zirconia-coated titanium oxide fine particles, a matrix component, and, if required, a thermal curing catalyst or an additive, and can be produced by mixing these components, for example, in accordance with the disclosures in patent literature JPA 2000-204301.

The photocurable paint composition includes zirconia-coated titanium oxide fine particles, a matrix component, and, if required, a photocuring catalyst or an additive, and can be produced by mixing these components, for example, in accordance with the disclosures in patent literature JPA 2009-056387.

Examples of the matrix components include methyltrimethoxysilane, ethyltriethoxysilane, methyltriethoxysilane, phenyltriethoxysilane, dimethyldimethoxysilane, phenylmethyldimethoxysilane, vinyltrimethoxysilane, vinyltriethoxysilane, vinyltris(β-methoxyethoxy) silane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, γ-methacryloxypropyltrimethoxysilane, N-β(aminoethyl) γ-aminopropyltrimethoxysilane, N-β(aminoethyl) γ-aminopropylmethyldimethoxysilane, γ-aminopropyltriethoxysilane, N-phenyl-γ-aminopropyltrimethoxysilane and γ-mercaptopropyltrimethoxysilane. These may be used singly, or two or more may be used in combination.

Examples of the thermal curing catalysts include amines such as n-butylamine, triethylamine, guanidine and biguanide, amino acids such as glycine, metal acetylacetonates such as aluminum acetylacetonate, chromium acetylacetonate, titanyl acetylacetonate and cobalt acetylacetonate, organic acid metal salts such as sodium acetate, zinc naphthenate, cobalt naphthenate, zinc octylate and tin octylate, perchloric acid and salts thereof such as perchloric acid, ammonium perchlorate and magnesium perchlorate, acids such as hydrochloric acid, phosphoric acid, nitric acid and p-toluenesulfonic acid, and metal chlorides which are Lewis acids such as $SnCl_2$, $AlCl_3$, $FeCl_3$, $TiCl_4$, $ZnCl_2$ and $SbCl_3$. These may be used singly, or two or more may be used in combination.

Examples of the photocuring catalysts include bis(2,4,6-trimethylbenzoyl)phenylphosphine oxide, bis(2,6-dimethoxybenzoyl)-2,4,4-trimethyl-pentylphosphine oxide, 2-hydroxy-methyl-2-methyl-phenyl-propane-1-ketone, 2,2-dimethoxy-1,2-diphenylethan-1-one, 1-hydroxy-cyclohexyl-phenyl-ketone and 2-methyl-1-[4-(methylthio)phenyl]-2-morpholinopropan-1-one.

These may be used singly, or two or more may be used in combination.

Examples of the additives include surfactants, leveling agents, UV absorbers, light stabilizers, diluting solvents, preservatives, antifouling agents, antimicrobial agents, antifoaming agents, UV degradation inhibitors and dyes. These may be used singly, or two or more may be used in combination.

[Coated Substrates]

A coated substrate according to the present invention includes a substrate and a coating film disposed on a surface of the substrate, the coating film being formed from the paint composition of the present invention.

Examples of the substrate include various substrates such as glass substrates and plastic substrates. Specific examples include plastic substrates used as, for example, optical lenses.

The thickness of the coating film varies depending on the usage of the coated substrate, and is preferably 0.03 to 30 μm.

When the thermally curable paint composition is used, the coated substrate according to the present invention may be produced based on the description of, for example, patent literature JPA 2000-204301. When the photocurable paint composition is used, the coated substrate may be produced based on the description of, for example, patent literature JPA 2009-56387. The thermally curable paint composition or the photocurable paint composition may be applied onto the substrate by a known technique such as dipping, spraying, spinner coating process, roll coating process or bar coating process, followed by drying, and the coating film may be cured by treatment such as heating or UV irradiation.

During the production of the coated substrate according to the present invention, the surface of the substrate may be pretreated, for example, treated with an alkali, an acid or a surfactant, polished with inorganic or organic fine particles, or subjected to a primer treatment or a plasma treatment, for the purpose of enhancing the adhesion between the substrate, for example, a plastic substrate, and the coating film.

EXAMPLES

The present invention will now be described in greater detail through Examples hereinbelow. However, the scope of the present invention is not limited to such Examples.

[Measurement Methods and Evaluation Methods]

Various types of measurement and evaluation were carried out as follows.

[1] Average Particle Size

Particles were diluted with a dispersion medium to a solid concentration of 0.1 mass %, and the particle size distribution was measured with a fine particle grain size analyzer (ELS-Z manufactured by OTSUKA ELECTRONICS Co., LTD.) based on a dynamic light scattering method. The refractive index and viscosity of the dispersion medium were used as the refractive index and viscosity of the solution. The average particle size was determined by cumulant analysis.

[2] Evaluation of Haze (Hz)

The solid concentration of a measurement sample was adjusted to 1.5 mass % by water dilution or concentration using a rotary evaporator, the resulting measurement sample was placed in a cell having an optical path length of 33 mm, and the haze was measured with a colorimeter/turbidity meter (COH-400 manufactured by NIPPON DENSHOKU INDUSTRIES CO., LTD.).

[3] Solid Concentration

After the solvent contained in the measurement sample was removed by, for example, infrared irradiation, the residue was calcined at 1000° C. for 1 hour to obtain an ignition residue (solid). The ratio of the mass of the ignition residue to the mass of the sample was assumed to be the solid concentration.

[4] Method for Determining Particle Composition (Titanium, Tin, Silicon, Iron, and Antimony).

An aqueous dispersion of a measurement sample (inorganic oxide fine particles such as titanium oxide fine particles) was placed into a zirconia bowl, and water was removed by infrared irradiation. $Na_2O_2$ and NaOH were added to the resultant dry residue, and the mixture was heated to give a melt. Further, sulfuric acid and hydrochloric acid were added to the melt, and water as a diluent was added.

The amounts of titanium, tin, silicon, iron, and antimony in terms of oxide ($TiO_2$, $SnO_2$, $SiO_2$, $Fe_2O_3$, and $Sb_2O_5$) in the obtained solution were measured by using an ICP apparatus (ICPS-8100 manufactured by Shimadzu Corporation).

(Nickel, Zirconium, and Aluminum)

An aqueous dispersion of a measurement sample was placed onto a platinum dish, and hydrofluoric acid and sulfuric acid were added thereto. The resulting mixture was heated, and water was added thereto to dissolve the inorganic oxide particles. The resulting solution was diluted with water, and the amounts of nickel, zirconium, and aluminum in terms of oxide (Nio, $ZrO_2$, and $Al_2O_3$) were measured by using an ICP apparatus (ICPS-8100 manufactured by Shimadzu Corporation).

(Potassium)

An aqueous dispersion of a measurement sample was placed onto a platinum dish, and hydrofluoric acid and sulfuric acid were added thereto. The resulting mixture was heated, and hydrochloric acid was added thereto to dissolve the inorganic oxide particles. Furthermore, the solution was diluted with water, and the amount of potassium in terms of oxide ($K_2O$) was measured by using an atomic absorption apparatus (Z-5300 manufactured by Hitachi, Ltd.).

Based on the measurement results, the contents of the components in the inorganic oxide fine particles were calculated.

[5] Crystalline Form of Particles

Approximately 30 mL of an aqueous dispersion of a measurement sample was placed into a porcelain crucible (model: B-2) and was dried at 110° C. for 12 hours. The residue was placed in a desiccator and was cooled to room temperature. Next, the residue was crushed in a mortar for 15 minutes and was analyzed on an X-ray diffractometer (RINT 1400 manufactured by Rigaku Corporation) to identify the crystalline form.

[6] Observation of Particles

The shape of a measurement sample was observed with a scanning electron microscope (SEM) (S-5500 manufactured by Hitachi High-Technologies Corporation) at an accelerating voltage of 30 kV. The sample for observation was prepared as follows.

An aqueous dispersion sol of a measurement sample was diluted with water to a solid concentration of 0.05 mass %. The diluted dispersion was applied to a collodion-coated metal grid (Okenshoji Co., Ltd.) and was irradiated with a 250 W lamp for 30 minutes to evaporate the solvent. A sample for observation was thus fabricated.

[7] Evaluation of Photocatalytic Activity-Reducing Effect of Titanium Oxide Fine Particles (Measurement of Color Fading Rate)

To an aqueous dispersion of inorganic oxide fine particles in an amount corresponding to a solid mass of 0.05 g, a solvent was appropriately added so that the water/methanol ratio (by mass) was 1/1 and the solid concentration was 0.5 mass %. Next, the resulting dispersion was mixed together with a glycerol solution of sunset yellow FCF dye having a solid concentration of 0.02 mass % so that the mass ratio (mass of dispersion/mass of glycerol solution) was 1/3. The sample thus prepared was placed in a quartz cell 1 mm in depth, 1 cm in width, and 5 cm in height. Next, the 1 cm (width)×5 cm (height) face of the quartz cell was irradiated with 0.4 mW/cm$^2$ (in terms of 365 nm wavelength) UV light emitted from a UV lamp (LUV-6 manufactured by AS ONE) placed 5.5 cm away from that face and preset to emit a range of wavelengths including i-line (wavelength: 365 nm).

The 490 nm-absorbance ($A_0$) of the sample before UV irradiation and the 490 nm-absorbance ($A_n$) of the sample after n hours of UV irradiation were measured with an ultraviolet visible light spectrophotometer (V-550 manufactured by JASCO), and the color fading rate of the dye was calculated from the following equations.

Ratio of change in color=$(A_n-A_0)/A_0 \times 100$(%)

PA (color fading rate)=ratio of change in color/UV irradiation time (%/h)

The UV irradiation time was adjusted as follows according to the color fading rate.
(1) If the color fading rate was 30%/h or more, the UV irradiation time was the time taken until the ratio of change in color reached 70 to 90%.
(2) If the color fading rate was 3%/h or more and less than. 30%/h, the UV irradiation time was 3 hours.
(3) If the color fading rate was less than 3%/h, the UV irradiation time was 20 hours.

[8] Methods for Measuring Thickness and Refractive Index of Coating Film

Reflectance spectra of a coating film and a coated substrate were measured by using an optical meter (USPM-RU III manufactured by Olympus Corporation), and the thickness and the refractive index of the coating film were calculated.

[9] Method for Measuring Particle Refractive Index

Multiple coating films having different titanium oxide fine particles-to-matrix ratios were prepared by the method described in paragraphs [0105] to [0110] of patent literature JPA 2010-168266, the refractive index of each coating film was determined by the aforementioned method, and then the particle refractive index was calculated.

[10] Evaluation of Weather Resistance of Thermally Cured Coating Film

A surface of a thermally cured coating film on a substrate was incised with a knife to form eleven parallel incisions at 1 mm intervals in each of the horizontal direction and the vertical direction, thereby forming one hundred squares. Next, the substrate coated with the thermally cured coating film was subjected to two cycles (24 hours) of an accelerated exposure test by using a QUV Accelerated Weathering Tester (QUV/spray manufactured by Q-Lab Corporation), where one cycle lasted a total of 12 hours involving irradiating the substrate with a UVA-340 lamp at an irradiation intensity of 0.70 W/m$^2$ at a temperature of 60° C. for 8 hours and then at a temperature of 50° C. for 4 hours while humidifying.

Next, an adhesive cellophane tape (CT405AP-15) produced by NICHIBAN Co., Ltd., was attached to the squares and peeled, and the presence or absence of detached squares was confirmed. When all the squares remained attached, the coated substrate was subjected again to the accelerated exposure test, and an adhesive cellophane tape was attached to the squares and peeled therefrom. This cycle was repeated, and the total UV irradiation time until one or more squares had detached was determined to evaluate adhesion weather resistance.

Another film coated with a photocured coating film was observed with naked eye to measure the time taken until a crack was confirmed and to thereby evaluate the weather cracking resistance.

Example 1

Step (1)

[Production of Titanium Oxide Fine Particles 1]

A white slurry having a pH of 9.5 was prepared by mixing 9.37 kg of an aqueous titanium tetrachloride solution (manufactured by OSAKA Titanium technologies Co., Ltd.) containing 7.75 mass % titanium tetrachloride in terms of TiO$_2$ and ammonia water (manufactured by UBE INDUSTRIES, LTD.) containing 15 mass % of ammonia. Next, the slurry was filtered, and the residue was washed with water. Thus, 7.27 kg of a hydrous titanic acid cake having a solid concentration of 10 mass % was obtained.

After 8.30 kg of an aqueous hydrogen peroxide solution (manufactured by MITSUBISHI GAS CHEMICAL COMPANY, INC.) containing 35 mass % hydrogen peroxide and 41.1 kg of water were added to the cake, the resulting mixture was stirred at 80° C. for 1 hour, and another 15.9 kg of water was added thereto. Thus, 72.6 kg of an aqueous peroxotitanic acid solution 1 was obtained which contained titanium oxide in an amount of 1 mass % in terms of TiO$_2$. The aqueous peroxotitanic acid solution 1 was transparent and yellow and had a pH of 8.5, and fine particles in the aqueous solution had an average particle size of 35 nm.

With the aqueous peroxotitanic acid solution 1 (72.6 kg), a cation exchange resin (manufactured by Mitsubishi Chemical Corporation) was mixed, and 9.07 kg of an aqueous potassium stannate solution containing 1 mass % potassium stannate (manufactured by Showa Kako Corporation) in terms of SnO$_2$ was gradually added thereto under stirring.

Next, the cation exchange resin which had trapped ions such as potassium ions was separated from the aqueous solution. Thereafter, to the aqueous solution were mixed 1.79 kg of water and 112 g of a silica fine particle sol 1 (hereinafter also referred to as the "silica sol 1", pH: 2.2, solid concentration: 16 mass %, manufactured by JGC CATALYSTS AND CHEMICALS LTD.) which contained 0.4 mass % of aluminum in terms of Al$_2$O$_3$. The resulting mixture was heated in an autoclave (manufactured by TAIATSU TECHNO CORPORATION, 120 L) at a temperature of 165° C. for 18 hours.

Next, the obtained sol was cooled to room temperature and then was concentrated with an ultrafiltration membrane apparatus (ACV-3010 manufactured by Asahi Kasei Corporation). Thus, 9.5 kg of an aqueous dispersion sol having a solid concentration of 10 mass % was obtained.

The fine particles contained in the aqueous dispersion sol were titanium oxide fine particles which had a rutile crystal structure and contained tin and silicon (hereinafter, the fine particles are referred to as the "titanium oxide fine particles 1"). The composition and physical properties of the titanium oxide fine particles 1 are shown in Table 1-1.

Step (2)

(Step (2a)

Under stirring, ammonia water containing 15 mass % of ammonia was gradually added to 2.63 kg of an aqueous zirconium oxychloride solution containing 2 mass % zirconium oxychloride (manufactured by TAIYO KOKO CO., LTD.) in terms of $ZrO_2$. A slurry with a pH of 8.5 was thus obtained. Next, after the slurry was filtered, the residue was washed with water. Thus, 526 g of a zirconia cake containing 10 mass % of zirconia in terms of $ZrO_2$ was obtained.

To 20 g of the cake, 180 g of water was added, and the system was rendered alkaline by adding 4.0 g of potassium hydroxide granules containing 85 mass % of potassium hydroxide (manufactured by KANTO CHEMICAL CO., INC.). Thereafter, 40 g of an aqueous hydrogen peroxide solution containing 35 mass % of hydrogen peroxide was added, and the mixture was heated to a temperature of 50° C. to dissolve the cake. Furthermore, 156 g of water was added. Thus, 400 g of an aqueous peroxozirconic acid solution 1 containing 0.5 mass % of peroxozirconic acid in terms of $ZrO_2$ was obtained. The pH of the aqueous peroxozirconic acid solution 1 was 12.9, the haze was 1.4%, and the average particle size was undetectable due to insufficient scattering intensity.

(Step (2b))

Titanium oxide fine particles 1 were diluted with water to prepare 70 g of a sol having a solid concentration of 2 mass %. To this sol, 19.6 g of the aqueous peroxozirconic acid solution 1 was added at room temperature, followed by stirring. As a result, an aqueous peroxozirconic acid solution mixture (hereinafter may be referred to as the "aqueous peroxozirconic acid solution mixture 1" or "mixture 1") was obtained. The fine particles in the mixture 1 had an average particle size (D2) of 19.7 nm and a haze (Hz2) of 9.6%.

The aqueous peroxozirconic acid solution mixture 1 was heat-treated at 60° C. for 6 hours and then cooled. As a result, a dispersion of a zirconia-coated titanium oxide fine particle precursor (hereinafter may also be referred to as the "precursor 1") was obtained. The precursor 1 had an average particle size (D3) of 26.1 nm and a haze (Hz3) of 9.8%.

Step (3)

The dispersion of the precursor 1 obtained in the step (2) was diluted with water to a solid concentration of 0.1 mass %, and the diluted dispersion was hydrothermally treated at 165° C. for 18 hours in an autoclave. As a result, a dispersion of zirconia-coated titanium oxide fine particles (hereinafter referred to as "coated fine particles 1") was obtained. The coated fine particles 1 had an average particle size (D4) of 19.2 nm and a haze (Hz4) of 7.8%. The photoactivity thereof was evaluated, and the color fading rate (PA4) was 5.7 (%/h). When the same particles were observed with a SEM, spindle-shaped particles having a major axis of about 15 to 20 nm were observed as with the titanium oxide fine particles 1 described above. When the same particles were dried and analyzed by XRD, the only diffraction pattern observed was that of the rutile type.

Example 2

Step (1)

The step (1) of Example 1 was performed.

Step (2)

A dispersion of a zirconia-coated titanium oxide fine particle precursor (hereinafter may also be referred to as the "precursor 2") was obtained as in the step (2) of Example 1 except that the heat treatment conditions for the aqueous peroxozirconic acid solution mixture 1 in the step (2) were changed to 80° C. and 1 hour. The physical properties of the precursor 2 are shown in Table 1-2.

Step (3)

A dispersion of zirconia-coated titanium oxide fine particles (hereinafter referred to as the "coated fine particles 2") was obtained as in the step (3) of Example 1 except that the dispersion of the precursor 1 was changed to the dispersion of the precursor 2. The physical properties of the coated fine particles 2 are shown in Table 1-3.

Example 3

Step (1)

The step (1) of Example 1 was performed.

Step (2)

A dispersion of a zirconia-coated titanium oxide fine particle precursor (hereinafter may also be referred to as the "precursor 3") was obtained as in the step (2) of Example 1 except that the heat treatment conditions for the aqueous peroxozirconic acid solution mixture 1 in the step (2) were changed to 80° C. and 3 hours. The physical properties of the precursor 3 are shown in Table 1-2.

Step (3)

A dispersion of zirconia-coated titanium oxide fine particles (hereinafter referred to as the "coated fine particles 3") was obtained as in the step (3) of Example 1 except that the dispersion of the precursor 1 was changed to the dispersion of the precursor 3. The physical properties of the coated fine particles 3 are shown in Table 1-3.

Example 4

Step (1)

The step (1) of Example 1 was performed.

Step (2)

A dispersion of a zirconia-coated titanium oxide fine particle precursor (hereinafter may also be referred to as the "precursor 4") was obtained as in the step (2) of Example 3 except that the amount of the aqueous peroxozirconic acid solution 1 added to the sol of the titanium oxide fine particles 1 was changed to 14 g. The physical properties of the precursor 4 are shown in Table 1-2.

Step (3)

A dispersion of zirconia-coated titanium oxide fine particles (hereinafter may also be referred to as the "coated fine particles 4") was obtained as in the step (3) of Example 2 except that the dispersion of the precursor 2 was changed to the dispersion of the precursor 4. The physical properties of the coated fine particles 4 are shown in Table 1-3.

Example 5

Step (1)

The step (1) of Example 1 was performed.

Step (2)

An aqueous peroxozirconic acid solution 1 was obtained by performing the step (2a) of Example 1.

The titanium oxide fine particles 1 were diluted with water to prepare 70 g of a sol having a solid concentration of 0.2 mass %. To this sol, 98 g of the aqueous peroxozirconic acid solution 1 was added at room temperature, followed by stirring. As a result, an aqueous peroxozirconic acid solution mixture 5 was obtained. The fine particles contained in the mixture 5 had an average particle size (D2) of 19.6 nm and a haze (Hz2) of 11.5%.

The aqueous peroxozirconic acid solution mixture 5 was heat-treated at 80° C. for 18 hours and then cooled. As a result, a dispersion of a zirconia-coated titanium oxide fine particle precursor (hereinafter may also be referred to as the "precursor 5") was obtained. The physical properties of the precursor 5 are shown in Table 1-2.

Step (3)

The dispersion of the precursor 5 was diluted with water to a solid concentration of 0.2 mass %, and the diluted dispersion was hydrothermally treated at 165° C. for 18 hours in an autoclave. As a result, a dispersion of zirconia-coated titanium oxide fine particles (hereinafter may also be referred to as "coated fine particles 5") was obtained. The physical properties of the coated fine particles 5 are shown in Table 1-3.

Example 6

Step (1)
[Production of Titanium Oxide Fine Particle Dispersion]

Mixed were 93.01 kg of the aqueous titanium tetrachloride solution and 0.618 kg of an iron oxide-containing aqueous solution containing 10 mass % of ferric chloride (manufactured by Hayashi Pure Chemical Ind., Ltd.) in terms of $Fe_2O_3$. The resultant mixture was mixed together with the ammonia water. Thus, a yellow slurry having a pH of 9.5 was obtained. Next, the slurry was filtered, and the residue was washed with water. Thus, 72.7 kg of an iron-containing hydrous titanic acid cake having a solid concentration of 10 mass % including iron was obtained.

After 83.0 kg of the aqueous hydrogen peroxide solution and 411.4 kg of water were added to the cake, the resulting mixture was stirred at 80° C. for 1 hour, and another 159 kg of water was added thereto. Thus, 726 kg of an iron-containing aqueous peroxotitanic acid solution was obtained. The iron-containing aqueous peroxotitanic acid solution was transparent and yellow brown and had a pH of 8.5, and fine particles in the aqueous solution had an average particle size of 35 nm.

With 72.9 kg of the iron-containing aqueous peroxotitanic acid solution, 3.5 kg of a cation exchange resin was mixed, and 9.11 kg of the aqueous potassium stannate solution was gradually added thereto under stirring.

The cation exchange resin which had trapped ions such as potassium ions was separated from the aqueous solution. Thereafter, to the aqueous solution were mixed 1.125 kg of the silica sol 1 and 18.0 kg of water. The resulting mixture was heated in an autoclave (manufactured by TAIATSU TECHNO CORPORATION, 120 L) at a temperature of 165° C. for 18 hours.

Next, the obtained sol was cooled to room temperature and then was concentrated with an ultrafiltration membrane apparatus (ACV-3010 manufactured by Asahi Kasei Corporation). Thus, 10.0 kg of an aqueous dispersion sol having a solid concentration of 10 mass % was obtained.

The fine particles contained in the aqueous dispersion sol obtained as such were iron-containing titanium oxide fine particles which had a rutile crystal structure and contained tin and silicon (hereinafter, the fine particles are referred to as the "titanium oxide fine particles 6"). The composition and physical properties of the titanium oxide fine particles 6 are shown in Table 1-1.

Steps (2) and (3)

An aqueous peroxozirconic acid solution mixture (hereinafter referred to as the "mixture 6"), then a dispersion of a zirconia-coated titanium oxide fine particle precursor (hereinafter referred to as the "precursor 6"), and then a dispersion of zirconia-coated titanium oxide fine particles (hereinafter referred to as the "coated fine particles 6") were obtained by performing the same operation as the steps (2) and (3) of Example 3 except that titanium oxide fine particles 6 were used instead of titanium oxide fine particles 1. The physical properties of the fine particles contained in the mixture 6, the precursor 6, and the coated fine particles 6 are shown in Tables 1-2 and 1-3.

Example 7

Step (1)
[Production of Titanium Oxide Fine Particle Dispersion]

An aqueous dispersion sol having a solid concentration of 10 mass % was obtained as in the step (1) of Example 6 except that the amount of the aqueous titanium tetrachloride solution was changed to 91.50 kg and the amount of the aqueous ferric chloride solution was changed to 1.818 kg. The fine particles contained in the aqueous dispersion sol were iron-containing titanium oxide fine particles which had a rutile crystal structure and contained tin and silicon (hereinafter, the fine particles are referred to as the "titanium oxide fine particles 7"). The composition and physical properties of the titanium oxide fine particles 7 are shown in Table 1-1.

Steps (2) and (3)

An aqueous peroxozirconic acid solution mixture (hereinafter referred to as the "mixture 7"), then a dispersion of a zirconia-coated titanium oxide fine particle precursor (hereinafter referred to as the "precursor 7"), and then a dispersion of zirconia-coated titanium oxide fine particles (hereinafter referred to as the "coated fine particles 7") were obtained by performing the same operation as the steps (2) and (3) of Example 3 except that titanium oxide fine particles 7 were used instead of titanium oxide fine particles 1. The physical properties of the fine particles contained in the mixture 7, the precursor 7, and the coated fine particles 7 Are shown in Tables 1-2 and 1-3.

Example 8

Step (1)

Mixed were 180.3 g of the aqueous titanium tetrachloride solution and 1.45 g of an aqueous nickel chloride solution containing 7.75 mass % of nickel chloride hexahydrate (manufactured by KANTO CHEMICAL CO., INC.) in terms of NiO. The resultant mixture was mixed together with ammonia water to thereby prepare a light green slurry having a pH of 9.0. Next, the slurry was filtered, and the residue was washed with water. Thus, 100 g of a nickel-containing hydrous titanic acid cake having a solid concentration of 12.7 mass % including nickel was obtained.

After 25.0 g of an aqueous hydrogen peroxide solution and 128.6 g of water were added to 17.2 g of the cake, the resulting mixture was stirred at 80° C. for 1 hour, and another 46.2 g of water was added thereto. Thus, 217 g of a Ni-containing aqueous peroxotitanic acid solution was obtained. The Ni-containing aqueous peroxotitanic acid solution was transparent and yellow, and had a pH of 8.0, and fine particles in the aqueous solution had an average particle size of 47 nm.

Next, the cation exchange resin was mixed with 217 g of the Ni-containing aqueous peroxotitanic acid solution, and 27.3 g of the aqueous potassium stannate solution was gradually added thereto under stirring.

The cation exchange resin which had trapped ions such as potassium ions was separated from the aqueous solution. Thereafter, to the aqueous solution were mixed 3.38 g of the silica sol 1 and 50.6 g of water. The resulting mixture was heated in a high-pressure reaction decomposition vessel (HU-100 manufactured by SAN-AI Kagaku Co. Ltd.) at 165° C. for 18 hours.

Next, the obtained sol was cooled to room temperature and then was concentrated with an ultrafiltration membrane apparatus (SIP-0013 manufactured by Asahi Kasei Corporation). Thus, 30 g of an aqueous dispersion sol having a solid concentration of 10 mass % was obtained.

The fine particles contained in the aqueous dispersion sol obtained as such were Ni-containing titanium oxide fine particles which had a rutile crystal structure and contained tin and silicon (hereinafter, the fine particles are referred to as the "titanium oxide fine particles 8"). The composition and physical properties of the titanium oxide fine particles 8 are shown in Table 1-1.

Steps (2) and (3)

An aqueous peroxozirconic acid solution mixture (hereinafter referred to as the "mixture 8"), then a dispersion of a zirconia-coated titanium oxide fine particle precursor (hereinafter referred to as the "precursor 8"), and then a dispersion of zirconia-coated titanium oxide fine particles (hereinafter referred to as the "coated fine particles 8") were obtained by performing the same operation as the steps (2) and (3) of Example 3 except that titanium oxide fine particles 8 were used instead of titanium oxide fine particles 1. The physical properties of the fine particles contained in the mixture 8, the precursor 8, and the coated fine particles 8 are shown in Tables 1-2 and 1-3.

Example 9

Step (1)
[Production of Titanium Oxide Fine Particle Dispersion]

Mixed were 141.9 g of the aqueous titanium tetrachloride solution and 11.52 g of an aqueous zirconium oxychloride solution containing 7.75 mass % of zirconium oxychloride (manufactured by TAIYO KOKO CO., LTD.) in terms of $ZrO_2$. The resultant mixture was mixed together with 62.86 g of the ammonia water (manufactured by UBE INDUSTRIES, LTD) to thereby prepare a white slurry having a pH of 9.3. Next, the slurry was filtered, and the residue was washed with water. Thus, 100 g of a hydrous titanic acid cake having a solid concentration of 10 mass % was obtained.

After 23.11 g of the aqueous hydrogen peroxide solution and 115.3 g of water were added to 19.54 g of the cake, the resulting mixture was stirred at 80° C. for 1 hour, and another 44.30 g of water was added thereto. Thus, 202 g of a zirconium-containing aqueous peroxotitanic acid solution 9 was obtained. The zirconium-containing aqueous peroxotitanic acid solution 9 was transparent and yellow, and had a pH of 8.1, and fine particles in the aqueous solution had an average particle size of 47.1 nm.

202 g of the zirconium-containing aqueous peroxotitanic acid solution 9 was taken and mixed with a cation exchange resin. To the resulting mixture, 27.33 g of aqueous potassium stannate solution was gradually added under stirring.

Next, the cation exchange resin which had trapped ions such as potassium ions was separated from the aqueous solution. Thereafter, to the aqueous solution were mixed 3.37 g of the silica sol 1 and 50.63 g of water. The resulting mixture was heated in a high-pressure reaction decomposition vessel (HU-100 manufactured by SAN-AI Kagaku Co. Ltd.) at 165° C. for 18 hours.

Next, the obtained sol was cooled to room temperature and then was concentrated with an ultrafiltration membrane apparatus (SIP-0013 manufactured by Asahi Kasei Corporation). Thus, 30 g of an aqueous dispersion sol having a solid concentration of 10 mass % was obtained.

The fine particles contained in the aqueous dispersion sol obtained as such were titanium oxide fine particles which had a rutile crystal structure and contained tin, silicon, and zirconium (hereinafter, the fine particles are referred to as the "titanium oxide fine particles 9"). Furthermore, when the same particles were observed with a SEM, spindle-shaped particles having a major axis of about 15 to 20 nm were observed. The composition and physical properties of the titanium oxide fine particles 9 are shown in Table 1-1.

Steps (2) and (3)

An aqueous peroxozirconic acid solution mixture (hereinafter referred to as the "mixture 9"), then a dispersion of a zirconia-coated titanium oxide fine particle precursor (hereinafter referred to as the "precursor 9"), and then a dispersion of zirconia-coated titanium oxide fine particles (hereinafter referred to as the "coated fine particles 9") were obtained by performing the same operation as the steps (2) and (3) as in Example 3 except that titanium oxide fine particles 9 were used instead of titanium oxide fine particles 1. The physical properties of the fine particles contained in the mixture 9, the precursor 9, and the coated fine particles 9 Are shown in Tables 1-2 and 1-3.

Example 10

Step (1)
[Production of Titanium Oxide Fine Particle Dispersion]

To 137.1 g of the aqueous titanium tetrachloride solution containing 7.75 mass % of titanium tetrachloride in terms of $TiO_2$, 1.61 g of antimony (III) chloride (manufactured by FUJIFILM Wako Pure Chemical Corporation) was added and dissolved. To the resulting mixture, 62.13 g of ammonia water was further mixed, and a white slurry having a pH of 8.7 was obtained as a result. Next, the slurry was filtered, and the residue was washed with water. Thus, 100 g of an antimony-containing hydrous titanic acid cake having a solid concentration of 10 mass % was obtained.

After 23.11 g of an aqueous hydrogen peroxide solution and 115.3 g of water were added to 19.54 g of the cake, the resulting mixture was stirred at 80° C. for 1 hour, and another 44.30 g of water was added thereto. Thus, 202 g of an antimony-containing aqueous peroxotitanic acid solution 10 was obtained. This aqueous peroxotitanic acid solution was transparent and yellow, and had a pH of 8.3, and fine particles in the aqueous solution had an average particle size of 42.9 nm.

Next, 202 g of the antimony-containing aqueous peroxotitanic acid solution 10 was taken and mixed with a cation exchange resin. To the resulting mixture, 27.33 g of aqueous potassium stannate solution was gradually added under stirring.

The cation exchange resin which had trapped ions such as potassium ions was separated from the aqueous solution.

Thereafter, to the aqueous solution were mixed 3.37 g of the silica sol 1 and 50.63 g of water. The resulting mixture was heated in a high-pressure reaction decomposition vessel (HU-100 manufactured by SAN-AI Kagaku Co. Ltd.) at 165° C. for 18 hours.

Next, the obtained sol was cooled to room temperature and then was concentrated with an ultrafiltration membrane apparatus (SIP-0013 manufactured by Asahi Kasei Corporation). Thus, 30 g of an aqueous dispersion sol having a solid concentration of 10 mass % was obtained.

The fine particles contained in the aqueous dispersion sol obtained as such were titanium oxide fine particles which had an anatase crystal structure and contained tin, silicon, and antimony (hereinafter, the fine particles are referred to as the "titanium oxide fine particles 10"). The composition and physical properties of the titanium oxide fine particles 10 are shown in Table 1-1.

Steps (2) and (3)

An aqueous peroxozirconic acid solution mixture (hereinafter referred to as the "mixture 10"), then a dispersion of a zirconia-coated titanium oxide fine particle precursor (hereinafter referred to as the "precursor 10"), and then a dispersion of zirconia-coated titanium oxide fine particles (hereinafter referred to as the "coated fine particles 10") were obtained by performing the same operation as the steps (2) and (3) of Example 3 except that titanium oxide fine particles 10 were used instead of titanium oxide fine particles 1. The physical properties of the fine particles contained in the mixture 10, the precursor 10, and the coated fine particles 10 are shown in Tables 1-2 and 1-3.

Example 11

Step (1)
[Production of Titanium Oxide Fine Particle Dispersion]

Mixed were 149.6 g of the aqueous titanium tetrachloride solution, 0.13 g of an aqueous nickel chloride solution containing 7.75 mass % of the nickel chloride hexahydrate in terms of NiO, and 12.16 g of the aqueous zirconium oxychloride solution. The resulting mixture was mixed with 66.32 g of ammonia water to thereby prepare a very light green slurry having a pH of 9.3. Next, the slurry was filtered, and the residue was washed with water. Thus, 100 g of a nickel- and zirconium-containing hydrous titanic acid cake having a solid concentration of 10 mass % was obtained.

After 23.11 g of an aqueous hydrogen peroxide solution and 115.3 g of water were added to 19.54 g of the cake, the resulting mixture was stirred at 80° C. for 1 hour, and another 44.30 g of water was added thereto. Thus, 202 g of a nickel- and zirconium-containing aqueous peroxotitanic acid solution 11 was obtained. This aqueous peroxotitanic acid solution was transparent and yellow, and had a pH of 8.2, and fine particles in the aqueous solution had an average particle size of 39.3 nm.

Next, 202 g of the nickel- and zirconium-containing aqueous peroxotitanic acid solution 11 was taken and mixed with a cation exchange resin (manufactured by Mitsubishi Chemical Corporation). To the resulting mixture, 27.33 g of the aqueous potassium stannate solution was gradually added under stirring.

Next, the cation exchange resin which had trapped/ions such as potassium ions was separated from the aqueous solution. Thereafter, to the aqueous solution were mixed 3.37 g of the silica sol 1 and 50.63 g of water. The resulting mixture was heated in a high-pressure reaction decomposition vessel (HU-100 manufactured by SAN-AI Kagaku Co. Ltd.) at 165° C. for 18 hours.

Next, the obtained sol was cooled to room temperature and then was concentrated with an ultrafiltration membrane apparatus (SIP-0013 manufactured by Asahi Kasei Corporation). Thus, 30 g of an aqueous dispersion sol having a solid concentration of 10 mass % was obtained.

The fine particles contained in the aqueous dispersion sol obtained as such were titanium oxide fine particles which had a rutile crystal structure and contained tin, silicon, and antimony (hereinafter, the fine particles are referred to as the "titanium oxide fine particles 11"). Furthermore, when the same particles were observed with a SEM, spindle-shaped particles having a major axis of about 15 to 20 nm were observed. The composition and physical properties of the titanium oxide fine particles 11 are shown in Table 1-1.

Steps (2) and (3)

An aqueous peroxozirconic acid solution mixture (hereinafter referred to as the "mixture 11"), then a dispersion of a zirconia-coated titanium oxide fine particle precursor (hereinafter referred to as the "precursor 11"), and then a dispersion of zirconia-coated titanium oxide fine particles (hereinafter referred to as the "zirconia-coated titanium oxide fine particles 11" or "coated fine particles 11") were obtained by performing the same operation as the steps (2) and (3) of Example 3 except that titanium oxide fine particles 11 were used instead of titanium oxide fine particles 1. The physical properties of the fine particles contained in the mixture 11, the precursor 11, and the coated fine particles 11 are shown in Tables 1-2 and 1-3.

Example 12

Step (1)
[Production of Titanium Oxide Fine Particle Dispersion]

Mixed were 195.8 g of the aqueous titanium tetrachloride solution and 5.15 g of an aqueous ferric chloride solution containing 7.75 mass % of ferric chloride in terms of $Fe_2O_3$. To the resultant mixture, 1.15 g of the antimony (III) chloride was mixed and dissolved, and 62.13 g of ammonia water was further mixed. Thus, a light yellow slurry having a pH of 9.3 was prepared. Next, the slurry was filtered, and the residue was washed with water. Thus, 100 g of an iron- and antimony-containing hydrous titanic acid cake having a solid concentration of 10 mass % was obtained.

After 23.11 g of an aqueous hydrogen peroxide solution (manufactured by MITSUBISHI GAS CHEMICAL COMPANY, INC.) and 115.3 g of water were added to 19.54 g of the cake, the resulting mixture was stirred at 80° C. for 1 hour, and another 44.30 g of water was added thereto. Thus, 202 g of an iron- and antimony-containing aqueous peroxotitanic acid solution 12 was obtained. This aqueous peroxotitanic acid solution was transparent and yellow, and had a pH of 7.1, and fine particles in the aqueous solution had an average particle size of 42.9 nm.

Next, 202 g of the iron- and antimony-containing aqueous peroxotitanic acid solution 12 was taken and mixed with a cation exchange resin. To the resulting mixture, 27.33 g of an aqueous potassium stannate solution containing 1 mass % potassium stannate (manufactured by Showa Kako Corporation) in terms of $SnO_2$ was gradually added under stirring.

Next, the cation exchange resin which had trapped ions such as potassium ions was separated from the aqueous solution. Thereafter, to the aqueous solution were mixed 3.37 g of the silica sol 1 and 50.63 g of water. The resulting mixture was heated in a high-pressure reaction decomposition vessel (HU-100 manufactured by SAN-AI Kagaku Co. Ltd.) at 165° C. for 18 hours.

Next, the obtained sol was cooled to room temperature and then was concentrated with an ultrafiltration membrane apparatus (SIP-0013 manufactured by Asahi Kasei Corporation). Thus, 30 g of an aqueous dispersion sol having a solid concentration of 10 mass % was obtained.

The fine particles contained in the aqueous dispersion sol obtained as such were titanium oxide fine particles which had a rutile crystal structure and contained tin, silicon, iron, and antimony (hereinafter, the fine particles are referred to as the "titanium oxide fine particles 12"). Furthermore, when the same particles were observed with a SEM, spindle-shaped particles having a major axis of about 15 to 20 nm were observed. The composition and physical properties of the titanium oxide fine particles 12 are shown in Table 1-1.

Steps (2) and (3)

An aqueous peroxozirconic acid solution mixture (hereinafter referred to as the "mixture 12"), then a dispersion of a zirconia-coated titanium oxide fine particle precursor (hereinafter referred to as the "precursor 12"), and then a dispersion of zirconia-coated titanium oxide fine particles (hereinafter referred to as the "zirconia-coated titanium oxide fine particles 12" or "coated fine particles 12") were obtained by performing the same operation as the steps (2) and (3) of Example 3 except that titanium oxide fine particles 12 were used instead of titanium oxide fine particles 1. The physical properties of the fine particles contained in the mixture 12, the precursor 12, and the coated fine particles 12 are shown in Tables 1-2 and 1-3.

Comparative Example 1

A dispersion of a zirconia-coated titanium oxide fine particle precursor (hereinafter may also be referred to as the "precursor 1B") and then a dispersion of the zirconia-coated titanium oxide fine particles (hereinafter referred to as the "coated fine particles 1B") were obtained as in Example 3 except that the heat treatment conditions for the aqueous peroxozirconic acid solution mixture 1 in the step 2 were changed to 90° C. and 3 hours. The physical properties of the precursor 1B and the coated fine particles 1B are shown in Tables 1-2 and 1-3. In a SEM observation of the coated fine particles 1B, a large amount of fine particles about several nanometers in diameter were observed in addition to spindle-shaped particles.

Comparative Example 2

A dispersion of a zirconia-coated titanium oxide fine particle precursor (hereinafter may also be referred to as the "precursor 2B") and then a dispersion of the zirconia-coated titanium oxide fine particles (hereinafter referred to as the "coated fine particles 2B") were obtained as in Example 3 except that the heat treatment conditions for the aqueous peroxozirconic acid solution mixture 1 in the step 2 were changed to 25° C. and 6 hours. The physical properties of the precursor 2B and the coated fine particles 2B are shown in Tables 1-2 and 1-3. In a SEM observation of the coated fine particles 2B, a large amount of fine particles about several nanometers in diameter were observed in addition to 15-20 nm spindle-shaped particles similar to the titanium oxide fine particles 1 before the zirconia coating treatment.

Comparative Example 3

Step (1)
The step. (1) of Example 1 was performed.
Step (2)
400 g of an aqueous peroxozirconic acid solution 1 was obtained as in the step (2) of Example 1.

The titanium oxide fine particles 1 were diluted with water to prepare 70 g of a sol having a solid concentration of 2 mass %. To this sol, 210 g of the aqueous peroxozirconic acid solution 1 was added at room temperature, followed by stirring. As a result, an aqueous peroxozirconic acid solution mixture (hereinafter referred to as the "mixture 3B") was obtained.

The mixture 3B was heat-treated at 80° C. for 3 hours and then cooled. As a result, a dispersion of a zirconia-coated titanium oxide fine particle precursor (hereinafter may also be referred to as the "precursor 3B") was obtained.
Step (3)
The dispersion of the precursor 3B was diluted with water to a solid concentration of 0.2 mass %, and the diluted dispersion was hydrothermally treated at 165° C. for 18 hours in an autoclave. As a result, a dispersion of zirconia-coated titanium oxide fine particles (hereinafter may also be referred to as "coated fine particles 3B") was obtained.

The physical properties of the precursor 3B and the coated fine particles 3B are shown in Tables 1-2 and 1-3. The coated fine particles 3B had a high haze and were unsuitable as an optical material.

Comparative Example 4

Step (1)
The step (1) of Example 1 was performed to obtain titanium oxide fine particles 1.
Step (2)
An aqueous peroxozirconic acid solution 1 was obtained by performing the step (2a) of Example 1.

A commercially available water glass (manufactured by AGC Si-Tech Co., Ltd.) was diluted with water and was then dealkalized using a cation exchange resin. Thus, an aqueous silicic acid solution containing 2 mass % silicon component in terms of $SiO_2$ was obtained.

Next, water was added to the titanium oxide fine particles 1 obtained in the step (1). Thus, 140 g of a sol having a solid concentration of 2 mass % was prepared. The sol was heated to a temperature of 90° C., and 9.58 g of the aqueous peroxozirconic acid solution 1 and 7.42 g of the aqueous silicic acid solution were gradually added. Upon completion of the addition, the resulting mixture was aged for 1 hour while keeping a temperature of 90° C. under stirring.
Step (3)
The aged mixture was placed in a high-pressure reaction decomposition vessel (HU-100 manufactured by SAN-AI Kagaku Co. Ltd.) and heated at 165° C. for 18 hours. A dispersion of the thus-obtained $SiO_2/ZrO_2$-coated titanium oxide fine particles (hereinafter may also be referred to as the "coated fine particles 4B") was obtained. The physical properties of the coated fine particles 4B are shown in Table 1-3.

Comparative Example 5

A dispersion of the $SiO_2/ZrO_2$-coated titanium oxide fine particles (hereinafter may also be referred to as the "coated fine particles 5B") was obtained as in Comparative Example 4 except that the amount of the aqueous peroxozirconic acid solution 1 and the amount of the aqueous silicic acid solution added in the step (2) were changed to, respectively, 34.16 g and 26.46 g. The physical properties of the coated fine particles 5B are shown in Table 1-3.

[Preparation of Organic Solvent Dispersion, Thermally Curable Paint Composition, and Substrate Coated with Thermally Cured Coating Film]

Example 13

[Preparation of Organic Solvent Dispersion]

The zirconia-coated titanium oxide fine particles 3 obtained in Example 3 were concentrated with an ultrafiltration membrane apparatus (SIP-0013 manufactured by Asahi Kasei Corporation). Thus, 60 g of an aqueous dispersion sol 18 having a solid concentration of 10 mass % was obtained.

While performing stirring, 60 g of the aqueous dispersion sol 18 was added to a solution prepared by dissolving 4.60 g of tetraethoxysilane (manufactured by Tama Chemicals Co., Ltd.) as a surface treating agent in methanol.

Next, the obtained liquid mixture was heated to 50° C. for 6 hours, cooled to room temperature, and passed through an ultrafiltration membrane apparatus to replace water as the dispersion medium by methanol. The resulting mixture was then further concentrated to give a methanol dispersion sol 13 having a solid concentration of 20 mass %.

[Preparation of Thermally Curable Paint Composition and Substrate Coated with Thermally Cured Coating Film]
(1) Preparation of Thermally Curable Paint Composition To 1.66 g of γ-glycidoxypropyltrimethoxysilane (manufactured by Momentive Performance Materials Japan Limited Liability Company), 0.249 g of methanol was added, and 0.49 g of a 0.01 N hydrochloric acid was added dropwise to the resulting mixture under stirring. The mixture was further stirred at room temperature for a whole day and night to hydrolyze the γ-glycidoxypropyltrimethoxysilane.

Next, 6.63 g of the methanol dispersion sol 17, 0.508 g of propylene glycol monomethyl ether (manufactured by Dow Chemical Japan Ltd.), 0.285 g of itaconic acid (manufactured by Kishida Chemical Co., Ltd.), 0.103 g of dicyandiamide 1 (manufactured by Kishida Chemical Co., Ltd.), and 0.067 g of a silicone surfactant (L-7001 manufactured by Dow Corning Toray Co., Ltd.) as a leveling agent were added to the above liquid mixture. The resultant mixture was stirred at room temperature for a whole day and night. Thus, a thermally curable paint composition (hereinafter, referred to as the "hardcoat paint 13") was prepared.

(2) Pretreatment of Plastic Lens Substrate

A required number of commercially available plastic lens substrates (name of monomer: "MR-7" manufactured by Mitsui Chemicals, Inc.) having a refractive index of 1.67 were prepared and were etched by being immersed in a 10 mass % aqueous KOH solution kept at 40° C. for 2 minutes. The substrates were taken out, washed with water, and thoroughly dried.

(3) Preparation of Substrate Coated with Thermally Cured Coating Film

The hardcoat paint 13 obtained as above was applied to a surface of each of the plastic lens substrates to form a coating film. The paint composition was applied by a spin coating method by adjusting the conditions such that the thickness after curing would be 2 μm. The coating film was cured by heat treatment that involved heating at 90° C. for 10 minutes and then at 110° C. for 2 hours. Thus, a substrate 13 coated with a thermally cured coating film was obtained.

Example 14

A methanol dispersion sol 14, a hardcoat paint 14, and a substrate 14 coated with a thermally cured coating film were obtained as in Example 13 except that the coated acid fine particles 11 were used instead of the zirconia-coated titanium oxide fine particles 3.

Example 15

A methanol dispersion sol 15, a hardcoat paint 15, and a substrate 15 coated with a thermally cured coating film were obtained as in Example 13 except that the coated fine particles 12 were used instead of the zirconia-coated titanium oxide fine particles 3.

Comparative Example 6

A methanol dispersion sol 6B, (a hardcoat paint 6B, and a substrate 6B coated with a thermally cured coating film were obtained as in Example 13 except that the coated fine particles 1B were used instead of the zirconia-coated titanium oxide fine particles 3.

Comparative Example 7

A methanol dispersion sol 7B, a hardcoat paint 7B, and a substrate 7B coated with a thermally cured coating film were obtained as in Example 13 except that the coated fine particles 4B were used instead of the zirconia-coated titanium oxide fine particles 3.

Comparative Example 8

A methanol dispersion sol 8B, a hardcoat paint 8B, and a substrate 8B coated with a thermally cured coating film were obtained as in Example 13 except that the coated fine particles 5B were used instead of the zirconia-coated titanium oxide fine particles 3.

Table 2 shows the results of evaluations of the substrates coated with the thermally cured coating films obtained in Examples 13 to 15 and Comparative Examples 6 to 8.

TABLE 1

| | Titanium oxide fine particles | | | | | | | | | | | | | | | | | | | |
|---|---|---|---|---|---|---|---|---|---|---|---|---|---|---|---|---|---|---|---|---|
| | Composition | | | | | | | | | | | Physical properties | | | | | | | | |
| | No. | TiO₂ | SiO₂ | SnO₂ | Fe₂O₃ | NiO | ZrO₂ | Sb₂O₅ | Al₂O₃ | K₂O | TiO₂/SnO₂ (mass ratio) | Crystal form | Particle refractive index n1 | Average particle size D1 (nm) | Haze Hz1 (%) | Color fading change rate PA1 (%/h) |
| Example 1 | 1 | 75.3 | 14.4 | 8.9 | 0.0 | 0.00 | 0.0 | 0.0 | 0.05 | 1.4 | 8.5 | Rutile | 2.20 | 19.6 | 3.6 | 42 |
| Example 2 | 1 | 75.3 | 14.4 | 8.9 | 0.0 | 0.00 | 0.0 | 0.0 | 0.05 | 1.4 | 8.5 | Rutile | 2.20 | 19.6 | 3.6 | 42 |
| Example 3 | 1 | 75.3 | 14.4 | 8.9 | 0.0 | 0.00 | 0.0 | 0.0 | 0.05 | 1.4 | 8.5 | Rutile | 2.20 | 19.6 | 3.6 | 42 |
| Example 4 | 1 | 75.3 | 14.4 | 8.9 | 0.0 | 0.00 | 0.0 | 0.0 | 0.05 | 1.4 | 8.5 | Rutile | 2.20 | 19.6 | 3.6 | 42 |
| Example 5 | 1 | 75.3 | 15.0 | 8.9 | 0.0 | 0.00 | 0.0 | 0.0 | 0.05 | 1.7 | 8.5 | Rutile | 2.20 | 19.6 | 3.6 | 42 |
| Example 6 | 6 | 72.7 | 14.4 | 9.9 | 0.6 | 0.00 | 0.0 | 0.0 | 0.05 | 1.4 | 7.3 | Rutile | 2.21 | 18.8 | 5.2 | 9.3 |
| Example 7 | 7 | 73.8 | 13.0 | 9.9 | 1.9 | 0.00 | 0.0 | 0.0 | 0.04 | 1.5 | 7.5 | Rutile | 2.25 | 20.1 | 6.2 | 0.68 |
| Example 8 | 8 | 74.7 | 14.7 | 8.9 | 0.0 | 0.35 | 0.0 | 0.0 | 0.05 | 1.4 | 8.4 | Rutile | 2.20 | 18.2 | 5.5 | 3.3 |
| Example 9 | 9 | 68.5 | 15.6 | 8.5 | 0.0 | 0.00 | 5.3 | 0.0 | 0.05 | 2.1 | 8.1 | Rutile | 2.17 | 19.6 | 7.7 | 6.6 |
| Example 10 | 10 | 67.2 | 15.8 | 9.1 | 0.0 | 0.00 | 0.0 | 6.5 | 0.04 | 1.4 | 7.4 | Anatase | 2.10 | 46.1 | 12.7 | 29 |
| Example 11 | 11 | 68.5 | 15.7 | 8.5 | 0.0 | 0.00 | 5.3 | 0.0 | 0.05 | 1.98 | 8.1 | Rutile | 2.17 | 18.9 | 6.3 | 3.3 |
| Example 12 | 12 | 68.7 | 15.6 | 8.7 | 1.7 | 0.03 | 0.0 | 3.6 | 0.04 | 1.8 | 7.9 | Rutile | 2.20 | 19.3 | 5.6 | 0.42 |
| Comp. Example 1 | 1 | 75.3 | 14.4 | 8.9 | 0.0 | 0.0 | 0.0 | 0.0 | 0.05 | 1.4 | 8.5 | Rutile | 2.20 | 19.6 | 3.6 | 42 |
| Comp. Example 2 | 1 | 75.3 | 14.4 | 8.9 | 0.0 | 0.0 | 0.0 | 0.0 | 0.05 | 1.4 | 8.5 | Rutile | 2.20 | 19.6 | 3.6 | 42 |
| Comp. Example 3 | 1 | 75.3 | 14.4 | 8.9 | 0.0 | 0.0 | 0.0 | 0.0 | 0.05 | 1.4 | 8.5 | Rutile | 2.20 | 19.6 | 3.6 | 42 |
| Comp. Example 4 | 1 | 75.3 | 14.4 | 8.9 | 0.0 | 0.0 | 0.0 | 0.0 | 0.05 | 1.4 | 8.5 | Rutile | 2.20 | 19.6 | 3.6 | 42 |
| Comp. Example 5 | 1 | 75.3 | 14.4 | 8.9 | 0.0 | 0.0 | 0.0 | 0.0 | 0.05 | 1.4 | 8.5 | Rutile | 2.20 | 19.6 | 3.6 | 42 |

| | Aqueous peroxozirconic acid solution | | Amount added* (parts by mass) | Mixture | | | | Step (2) | | | Precursor | | | | | | |
|---|---|---|---|---|---|---|---|---|---|---|---|---|---|---|---|---|---|
| | Composition | | | | Physical properties of fine particles | | | Heat treatment conditions | | | Physical properties | | | | | | |
| | KOH/ZrO₂ (mol ratio) | H₂O₂/ZrO₂ (mol ratio) | | No. | Average particle size D2 (nm) | Haze Hz2 (%) | D2/D1 | Hz2/Hz1 | Treatment temperature (°C.) | Treatment time (h) | No. | Average particle size D3 (nm) | Haze Hz3 (%) | Hz3/Hz2 | D3/D2 | D3/D1 | Hz3/Hz1 |
| Example 1 | 3.7 | 25 | 7 | 1 | 19.7 | 9.6 | 1.0 | 2.7 | 60 | 6 | 1 | 26.1 | 9.78 | 1.0 | 1.3 | 1.3 | 2.7 |
| Example 2 | 3.7 | 25 | 7 | 1 | 19.7 | 9.6 | 1.0 | 2.7 | 80 | 1 | 2 | 24.5 | 10.24 | 1.1 | 1.2 | 1.3 | 2.9 |
| Example 3 | 3.7 | 25 | 7 | 1 | 19.7 | 9.6 | 1.0 | 2.7 | 80 | 3 | 3 | 24.9 | 10.8 | 1.1 | 1.3 | 1.3 | 3.0 |
| Example 4 | 3.7 | 25 | 5 | 4 | 20.1 | 8.7 | 1.0 | 2.4 | 80 | 3 | 4 | 25.6 | 8.65 | 1.0 | 1.3 | 1.3 | 2.4 |
| Example 5 | 3.7 | 25 | 35 | 5 | 19.6 | 11.5 | 1.0 | 3.2 | 80 | 18 | 5 | 34.8 | 12.4 | 1.1 | 1.8 | 1.8 | 3.5 |
| Example 6 | 3.7 | 25 | 7 | 6 | 18.6 | 8.3 | 1.0 | 1.6 | 80 | 3 | 6 | 24.2 | 8.71 | 1.0 | 1.3 | 1.3 | 1.7 |
| Example 7 | 3.7 | 25 | 7 | 7 | 20.2 | 9.0 | 1.0 | 1.4 | 80 | 3 | 7 | 28.3 | 9.2 | 1.0 | 1.4 | 1.4 | 1.5 |
| Example 8 | 3.7 | 25 | 7 | 8 | 18.2 | 6.8 | 1.0 | 1.2 | 80 | 3 | 8 | 27.3 | 7.04 | 1.0 | 1.5 | 1.5 | 1.3 |
| Example 9 | 3.7 | 25 | 7 | 9 | 19.9 | 9.0 | 1.0 | 1.2 | 80 | 3 | 9 | 24.8 | 8.9 | 1.0 | 1.2 | 1.3 | 1.2 |
| Example 10 | 3.7 | 25 | 7 | 10 | 46.4 | 13.4 | 1.0 | 1.1 | 80 | 3 | 10 | 56.0 | 12.7 | 0.9 | 1.2 | 1.2 | 1.0 |

TABLE 1-continued

| | | | | | | | | | | | | | | | | | |
|---|---|---|---|---|---|---|---|---|---|---|---|---|---|---|---|---|---|
| Example 11 | 3.7 | 25 | 7 | 11 | 19.1 | 8.1 | 1.0 | — | — | — | 3 | 11 | 24.4 | 8.34 | 1.3 | 1.0 | 1.3 | 1.3 |
| Example 12 | 3.7 | 25 | 7 | 12 | 19.4 | 6.4 | 1.0 | — | — | — | 3 | 12 | 24.1 | 7.05 | 1.2 | 1.1 | 1.2 | 1.3 |
| Comp. Example 1 | 3.7 | 25 | 7 | 1 | 19.8 | 8.7 | 1.0 | — | — | — | 3 | 1B | 66.5 | 45.4 | 3.4 | 5.2 | 3.4 | 12.8 |
| Comp. Example 2 | 3.7 | 25 | 7 | 2 | 19.8 | 8.7 | 1.0 | — | — | — | 6 | 2B | 20.6 | 9.3 | 1.0 | 1.1 | 1.0 | 2.6 |
| Comp. Example 3 | 3.7 | 25 | 75 | 3B | 19.7 | 12.2 | 1.0 | — | — | — | 3 | 3B | 78.1 | 53.3 | 4.0 | 4.4 | 4.0 | 15.0 |
| Comp. Example 4 | 3.7 | 25 | 7 | — | — | — | — | — | — | — | — | — | — | — | — | — | — | — |
| Comp. Example 5 | 3.7 | 25 | 25 | — | — | — | — | — | — | — | — | — | — | — | — | — | — | — |

| | Hydrothermal treatment | | Coated fine particles | | | | | | | Step (3) | | | | |
|---|---|---|---|---|---|---|---|---|---|---|---|---|---|---|---|
| | Treatment temperature (°C) | Treatment time (h) | No. | Average particle size D4 (nm) | Haze Hz4 (%) | Particle shape (SEM) | Color fading rate PA4 (%/h) | Particle refractive index n4 | Δ in particle refractive index n4-n1 | D4/D2 | Hz4/Hz2 | D4/D1 | Hz4/Hz1 | PA4/PA1 |
| Example 1 | 165 | 18 | 1 | 19.2 | 7.75 | Spindle shape | 5.7 | 2.20 | 0.00 | 1.0 | 0.8 | 1.0 | 2.2 | 0.14 |
| Example 2 | 165 | 18 | 2 | 19.9 | 8.65 | Spindle shape | 9.3 | 2.20 | 0.00 | 1.0 | 0.9 | 1.0 | 2.4 | 0.22 |
| Example 3 | 165 | 18 | 3 | 21.0 | 8.6 | Spindle shape | 6.4 | 2.20 | 0.00 | 1.1 | 0.9 | 1.1 | 2.4 | 0.15 |
| Example 4 | 165 | 18 | 4 | 19.6 | 6.38 | Spindle shape | 14 | 2.20 | 0.00 | 1.0 | 0.7 | 1.0 | 1.8 | 0.33 |
| Example 5 | 165 | 18 | 5 | 21.7 | 9.21 | Spindle shape | 1.8 | 2.20 | 0.00 | 1.1 | 0.8 | 1.1 | 2.6 | 0.04 |
| Example 6 | 165 | 18 | 6 | 18.7 | 7.9 | Spindle shape | 2.9 | 2.20 | -0.01 | 1.0 | 0.9 | 1.0 | 1.5 | 0.31 |
| Example 7 | 165 | 18 | 7 | 20.1 | 8.1 | Spindle shape | 0.20 | 2.24 | -0.01 | 1.0 | 0.9 | 1.0 | 1.3 | 0.29 |
| Example 8 | 165 | 18 | 8 | 18.3 | 6.63 | Spindle shape | 0.79 | 2.20 | 0.00 | 1.0 | 1.0 | 1.0 | 1.2 | 0.24 |
| Example 9 | 165 | 18 | 9 | 20.5 | 8.18 | Spindle shape | 1.3 | 2.17 | 0.00 | 1.0 | 0.9 | 1.0 | 1.1 | 0.20 |
| Example 10 | 165 | 18 | 10 | 46.6 | 12.4 | — | 7.3 | 2.10 | 0.00 | 1.0 | 0.9 | 1.0 | 1.0 | 0.25 |
| Example 11 | 165 | 18 | 11 | 19.2 | 6.94 | Spindle shape | 0.77 | 2.17 | 0.00 | 1.0 | 0.9 | 1.0 | 1.1 | 0.23 |
| Example 12 | 165 | 18 | 12 | 19.5 | 7.01 | Spindle shape | 0.13 | 2.20 | 0.00 | 1.0 | 1.1 | 1.0 | 1.3 | 0.31 |
| Comp. Example 1 | 165 | 18 | 1B | 26.3 | 13.49 | Spindle shape + fine particles | 40 | 2.20 | 0.00 | 1.3 | 1.6 | 1.3 | 3.8 | 0.96 |
| Comp. Example 2 | 165 | 18 | 2B | 19.5 | 8.9 | Spindle shape + fine particles | 37 | 2.20 | 0.00 | 1.0 | 1.0 | 1.0 | 2.5 | 0.89 |
| Comp. Example 3 | 165 | 18 | 3B | 70.3 | 40.3 | Spindle shape + fine particles | — | — | — | 3.6 | 3.3 | 3.6 | 11.3 | — |
| Comp. Example 4 | 165 | 18 | 4B | 20.2 | 9.3 | Spindle shape | 17.8 | 2.15 | -0.05 | 1.0 | — | 1.0 | 2.6 | 0.42 |
| Comp. Example 5 | 165 | 18 | 5B | 20.3 | 10.2 | Spindle shape | 6.6 | 2.00 | -0.20 | 1.0 | — | 1.0 | 2.9 | 0.16 |

*Amount in terms for $ZrO_2$ per 100 parts by mass of titanium oxide fine particles.

TABLE 2

|  | Example 13 | Example 14 | Example 15 | Comparative Example 6 | Comparative Example 7 | Comparative Example 8 |
|---|---|---|---|---|---|---|
| Coated fine particles | 3 | 11 | 12 | 1B | 4B | 5B |
| Coating film refractive index | 1,664 | 1,659 | 1,664 | 1,664 | 1,656 | 1,629 |
| Color tone (visually observed) | Colorless and transparent | Colorless and transparent | Slightly yellow | Colorless and transparent | Colorless and transparent | Colorless and transparent |
| Adhesion weather resistance (exposure time until film detachment) | 96 h | 192 h | >312 h | 24 h | 72 h | 96 h |
| Weather cracking resistance (exposure time until cracking) | 120 h | 240 h | >312 h | 48 h | 72 h | 120 h |

The invention claimed is:

1. Zirconia-coated titanium oxide fine particles comprising:
    titanium oxide fine particles satisfying Requirement (a) below; and
    zirconia coating layers covering the titanium oxide fine particles and satisfying Requirement (b) below,
    wherein the zirconia-coated titanium oxide fine particles as a whole satisfy Requirement (c) below and have an average particle size of 3 to 50 nm;
    Requirement (a): The titanium oxide fine particles contain 60 mass % or more of Ti in terms of the mass of $TiO_2$ and at least one metal element selected from the group consisting of Al, Zr, Sb, Zn, Ni, Fe, Ba, Mg, Sn, Si, and V;
    Requirement (b): The amount of the zirconia coating layers per 100 parts by mass of the titanium oxide fine particles is 1 to 50 parts by mass in terms of the mass of $ZrO_2$;
    Requirement (c): When the average particle size and the color fading rate of the titanium oxide fine particles are represented by D1 and PA1, respectively, and the average particle size and the color fading rate of the zirconia-coated titanium oxide fine particles are represented by D4 and PA4, respectively, D4/D1 is 0.8 to 1.2 and PA4/PA1 is 0.4 or less.

2. The zirconia-coated titanium oxide fine particles according to claim 1, wherein the titanium oxide fine particles contain Ti and Sn in such amounts that the $TiO_2/SnO_2$ mass ratio is 3 to 16.

3. A dispersion of the zirconia-coated titanium oxide fine particles according to claim 1.

4. The zirconia-coated titanium oxide fine particles according to claim 1, wherein an amount of components other than zirconia in the coating layers is 10% or less by mass.

* * * * *